Sept. 27, 1949.    W. G. HARVEY    2,483,093
STRIPPING AND KNOCKOUT MECHANISM FOR MOLDING DIES
Filed May 6, 1946    3 Sheets-Sheet 1

INVENTOR
WILFRED G. HARVEY
BY Owen W. Kennedy
ATTORNEY

Sept. 27, 1949. W. G. HARVEY 2,483,093
STRIPPING AND KNOCKOUT MECHANISM FOR MOLDING DIES
Filed May 6, 1946 3 Sheets-Sheet 2

INVENTOR
WILFRED G. HARVEY
BY Owen W. Kennedy
ATTORNEY

Sept. 27, 1949.　　　　W. G. HARVEY　　　　2,483,093
STRIPPING AND KNOCKOUT MECHANISM FOR MOLDING DIES
Filed May 6, 1946　　　　　　　　　　　　　3 Sheets-Sheet 3

INVENTOR.
WILFRED G. HARVEY
BY Owen W. Kennedy
ATTORNEY

Patented Sept. 27, 1949

2,483,093

UNITED STATES PATENT OFFICE 2,483,093

STRIPPING AND KNOCKOUT MECHANISM FOR MOLDING DIES

Wilfred G. Harvey, Leominster, Mass.

Application May 6, 1946, Serial No. 667,508

6 Claims. (Cl. 18—42)

The present invention relates to dies or molds of the type that are customarily employed in connection with injection molding machines, and has for its object to provide an improved stripping and knockout mechanism for such dies.

Generally speaking, there are two problems encountered in the operation of dies and molds of the above indicated character, first, the stripping of the molded articles off the usual cores or plugs around which the articles are formed, and second, the ejection or knocking out of the molded articles from the molding cavities. In the operation of plastic injection molding machines at a high production rate, it frequently happens that the molded articles are still in a somewhat plastic condition when dies or molds are opened; therefore, it is essential that the stripping and knockout operations be performed without subjecting the molded articles to forces that might result in defacing or otherwise damaging the same.

With the above described operating problems in mind, the present invention provides an improved stripping and knockout mechanism for molding dies, characterized by the fact that the stripping and knockout operations are separately performed on the molded articles in such a manner that the articles are freed and ejected from the dies or molds without subjecting them to strains which might result in damaging the articles. Briefly stated, the mechanism of the present invention resides in providing one of the relatively movable dies with a stripping and knockout mechanism, comprising independently operable elements adapted to separately perform the stripping and knockout operations in a predetermined sequence that is timed to clear the molded articles from the dies as the latter are opened. The above and other advantageous features of the invention will hereinafter more fully appear from the following description considered in connection with the accompanying drawings, in which:

Figure 1:
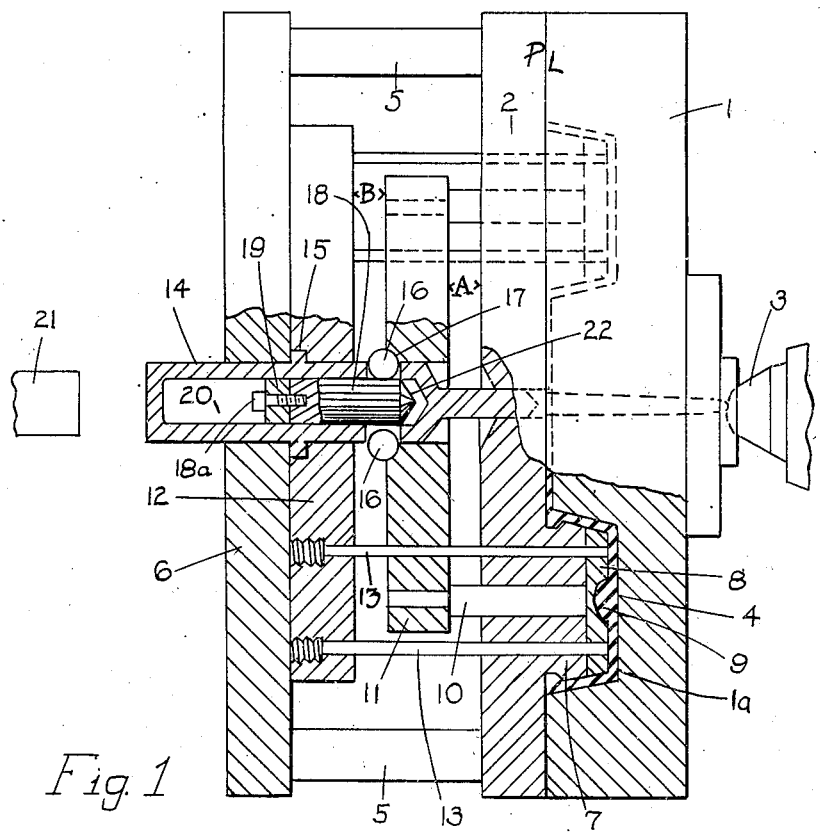
Fig. 1 is a view partially in section and partially in side elevation of an operating mechanism for molding dies embodying the present invention, with the dies in closed position.

Referring to the drawings, the invention is shown for purposes of illustration in connection with the relatively movable molds or dies 1 and 2 of an injection molding machine of a conventional construction, which provides a suitable nozzle 3 for injecting plastic material into the dies 1 and 2 to form molded articles 4 within the molding cavities, hereinafter described in detail. As is usual in molding machines, the die 1 is fixed while the die 2 is movable, for which purpose the die 2 is connected by rods 5 to an operating plate 6, which is adapted to be moved to the left by suitable mechanism, not shown, to separate the dies 1 and 2 along the parting line PL.

Figure 4:
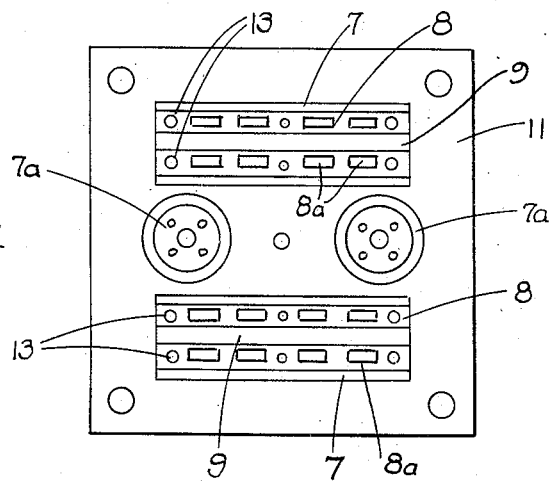
Fig. 4 is a view in front elevation of the movable die.

The movable die 2 provides a number of projections or cores 7 and 7a, one of which is shown in section in Fig. 1, around which the plastic material of the article 4 is molded in cooperation with a molding cavity 1a in the die 1. As shown in Fig. 4, these cores 7 and 7a are arranged around the injection nozzle 3, and the several molding cavities 1a of the die 1 are connected by suitable gates to the central sprue-way in the usual manner, as indicated in dotted lines in Fig. 1. For purposes of illustration, the molded articles 4 are shown as being either rectangular or circular in form, as indicated by the outlines of the cores 7 and 7a in Fig. 4, and obviously the stripping and knockout mechanism of the present invention is in no way limited to the particular form of molded articles which are produced.

Figure 2:
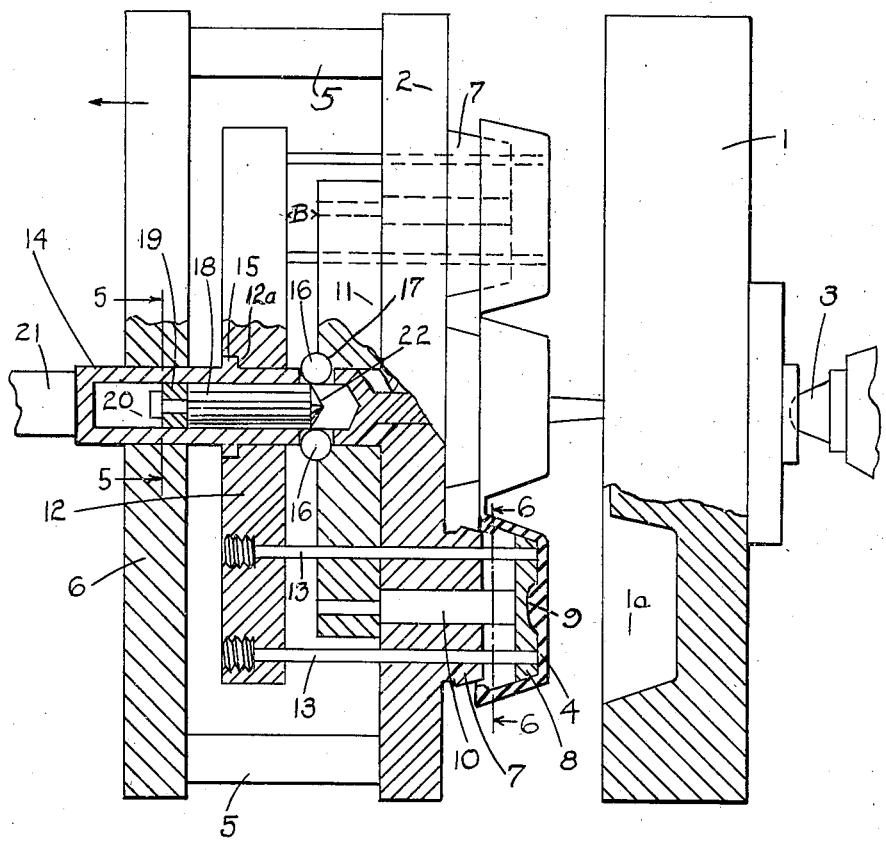
Fig. 2 is a view similar to Fig. 1, illustrating the stripping of a molded article from one of the dies.

As best shown in the sectioned portions of Figs. 1 and 2, each molded article 4 is also formed over a stripper head 8 abutting the core 7 when the dies are closed, and for purposes of illustration, the head 8 is shown as providing on its front face a molding cavity 9 into which some of the material of the article 4 extends as a result of the molding operation. When the dies 1 and 2 are opened along the parting line PL by movement of the operating plate 6 to the left as indicated by the arrow in Fig. 2, the molded articles come out of the molding cavities 1a of the die 1. Assuming that the dies open while the molded articles 4 are still somewhat plastic, there exists the problem of getting each article off its core 7 and out of the cavity 9 without deforming the same, and the mechanism hereinafter described accomplishes this purpose by first moving the article, as a whole, to strip it from the core 7, and then applying localized pressure to the stripped article itself to eject or knock it out of the molding cavity 9.

The stripper head 8 is mounted on a rod 10 that extends freely through the core 7 and die 2, and is attached to a stripper operating plate 11. In the closed position of the dies 1 and 2 shown in Fig. 1, the plate 11 is disposed between the back face of the die 2 and a knockout plate 12, with a predetermined gap A between the die 2 and plate 11, and a second gap B between the plates 11 and 12. The plate 12 carries knockout pins 13 extending freely through both the stripper plate 11 and the die 2, with the ends of the pins 13 normally flush with that portion of the molded article 4 which is in engagement with the stripper head 8. The plate 12 is shown flush with the die operating plate 6 in Fig. 1, and is capable of only limited movement with the plate 6 through the operation of the mechanism next to be described.

Figure 5:
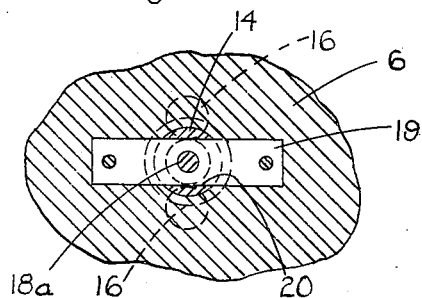
Fig. 5 is a fragmentary sectional view along the line 5—5 of Fig. 2, looking in the direction of the arrows.

For the purpose of controlling relative movement between the plates 11 and 12, as well as between the plate 12 and the die operating plate 6, the plate 12 is mounted on a sleeve 14 extending freely through the plate 6 and providing a shoulder 15 seated within an annular recess 12a provided by the plate 12. The sleeve 14 extends through the gap B between the plates 11 and 12, and a pair of balls 16 is confined within the sleeve 14 adjacent a circular groove 17 provided in the plate 11. The balls 16 normally ride on a stud 18 extending freely through the sleeve 14, with the rear end of the stud 18, connected by a pin 18a to a cross bar 19 attached at its ends to the die operating plate 6, as shown in Fig. 5. It is to be noted that the cross bar 19 is movable freely in a slot 20 provided in the sleeve 14, so that the stud 18 will move with the die operating plate 6, within the sleeve 14, independently of the plate 12, as will be apparent from a comparison between Figs. 1 and 2.

It is to be noted that with the dies 1 and 2 closed for the molding operation, as shown in Fig. 1, the rear or left hand end of the sleeve 14 is spaced a predetermined distance from a fixed stop 21 in alinement with the sleeve 14. This stop 21 is mounted on the frame of the machine, not shown, and with the end of the sleeve 14 spaced from the stop 21, the cross bar 19 which carries the stud 18 occupies a position substantially midway of the sleeve slot 20. In this position the stud 18 extends beyond the balls 16, with bevelled end surfaces 22 disposed within the stripper plate 11 just beyond the balls, for a purpose which will later appear.

Assuming that the articles 4 have been molded within the closed dies 1 and 2, the first step in stripping and ejecting the article 4 consists in moving the die operating plate 6 to the left, as indicated by the arrow in Fig. 2, to cause an initial separation between the dies 1 and 2 along the parting line PL. When this occurs, the plates 11 and 12 move with the plate 6, with all parts of the movable die assembly maintaining their initial relation as shown in Fig. 1, as the left hand end of the sleeve 14 approaches the stop 21. However, when the sleeve 14 engages the stop 21 as shown in Fig. 2, the plate 12 is held against further movement with the plate 6 by the shoulder 15 of the sleeve 14, and the stripper plate 11 is temporarily held in the position of Fig. 1 by the balls 16 confined within the then stationary sleeve 14.

Therefore, when the stripper plate 11 ceases to move with the die operating plate 6, further movement of the die 2 closes the gap A, so that the die 2 engages the then stationary plate 11. When this occurs, the relative movement between the core 7 and the stripper head 8 that is mounted on the plate 11 causes the molded article 4 to be stripped from the core 7 and to be held in position on the head, as shown in Fig. 2, with some of the molded material seated in the cavity 9 on the head 8.

Figure 3:
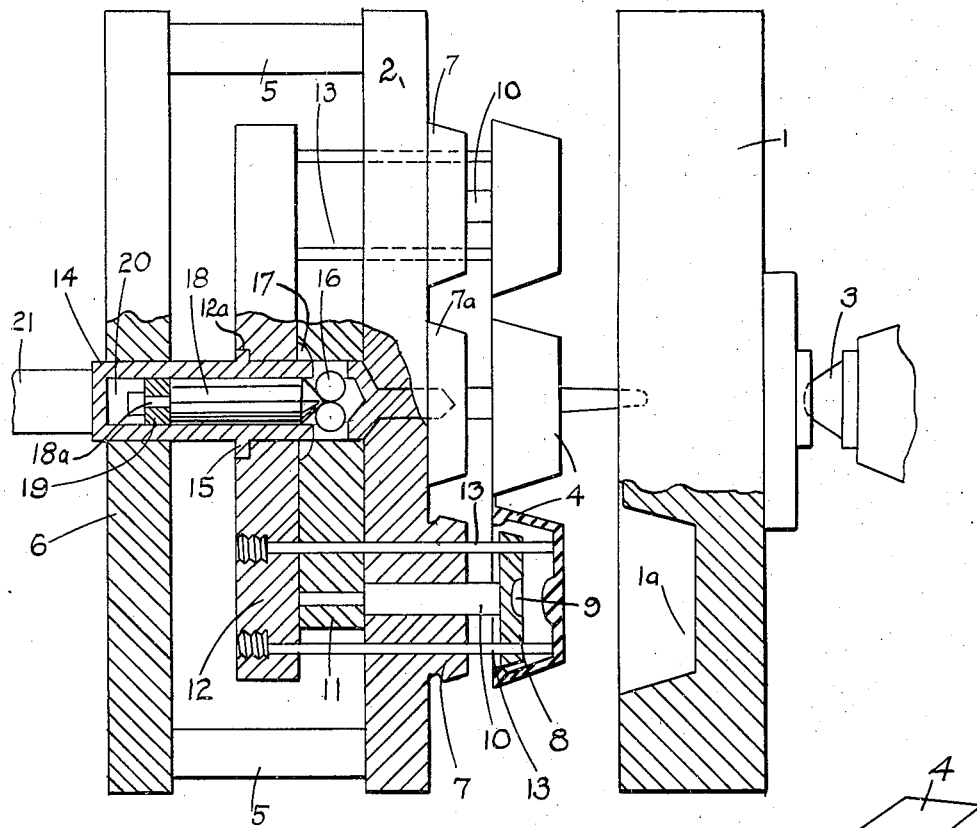
Fig. 3 is a view similar to Fig. 1, illustrating the knockout or ejection of a molded article from one of the dies.

The first step of stripping the article 4 from the core 7 having been accomplished, the die operating plate 6 continues to move to the left, with the knockout plate 12 held stationary by the sleeve 14 through the shoulder 15, and with the stripper plate 11 engaged with the die 2. As this occurs, movement of the stud 18 with the cross bar 19 on the plate 6 disposes the bevelled end surfaces 22 of the stud behind the balls 16, which are thereupon collapsible within the sleeve 14, as shown in Fig. 3. Upon retraction of the balls 16, the stripper plate 11 is free to move with the die 2, thereby closing the gap B between the plates 11 and 12.

Since, as previously pointed out, the knockout plate is still held stationary by the shoulder 15 on the sleeve 14 which is against the stop 21, closing of the gap B causes the knockout pins 13 to engage the molded article 4 around the molding cavity 9. Therefore, as the die plate 6 completes its left hand movement as shown in Fig. 3, the article 4 is completely ejected from the cavity 9 and is free to fall into the space between the then fully opened dies 1 and 2.

From the foregoing, it is apparent that by the present invention there is provided an improved stripping and knockout mechanism for molding dies, comprising independently operable elements adapted to separately perform the stripping and knockout operations in a predetermined sequence that is timed to clear the molded articles from the dies as the latter are opened. As a result, each molded article is first moved, as a whole, to strip it and then is subjected to localized pressure to eject or knock it out of the molding cavity without deforming or defacing the same.

Figure 7:
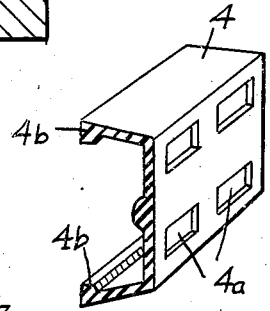
Fig. 7 is a view, partially in section and partially in perspective, of a molded article cleared from the dies.
Figure 6:
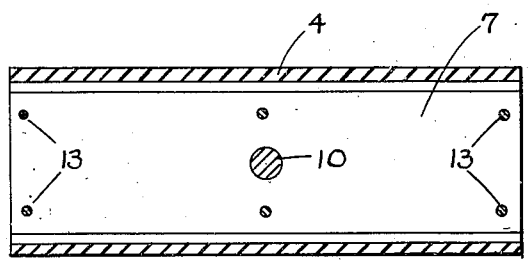
Fig. 6 is a fragmentary sectional view along the line 6—6 of Fig. 2, looking in the direction of the arrows.

While, as previously pointed out, the present mechanism is in no way limited to the particular form of molded articles produced, Fig. 7 shows an article having certain essential characteristics which render the present mechanism particularly effective in stripping and ejecting this article from the molding dies. As shown in Fig. 7, the front face of the article 4 provides windows 4a formed by projections 8a on the head 8 between the pins 13 as indicated in Fig. 4. Furthermore, the sides of the article 4 provide internal ridges 4b formed by suitable recesses 7b on the core 7.

When the article has been molded and is still in a somewhat warm and plastic condition, obviously operation of the pins 13 before the article has been stripped from the core 7 might result in the pins 13 pushing through, or breaking out portions of the front face between the windows 4a. However, by first moving the molded article bodily, while supported on the head 8, the sides of the article are stripped from the core 7 as shown in Fig. 2, with the ridges 4b readily clearing themselves from the recesses 7b of the core, by reason of the inclination of the sides of the ridges. Therefore, when the pins 13 eject the article from the head 8, the ridges 4b are already clear of the core 7 and so do not oppose movement of the article as a whole under the pressure of the pins 13.

I claim:
1. A mechanism of the class described comprising, in combination, cooperating dies for the production of molded articles, a first one of said dies being movable relative to a second die, a pair of elements for engaging a molded article and both slidably mounted within said first die and being movable with that die a predetermined distance as said dies initially open, a stop stationary with respect to the movable die, arresting means engageable with said stop for preventing the movement of both of said elements with said first die upon a further predetermined movement of said first die thereby to dislodge a molded article from said first die, and means responsive to a final predetermined movement of said first die for releasing one element only from said arresting means and for shifting said released element relative to said other element in synchronism with said first die thereby to separate the molded article from said elements.

2. A mechanism of the class described comprising, in combination, cooperating dies for the production of molded articles, a first one of said dies being movable relative to a second die to permit the removal of a molded article, means for dislodging the article from said first die, said means including relatively movable plates carried at one side of said first die, elements for engaging said article rigidly carried upon each of said plates and being slidably mounted within said first die, said plates being initially spaced from each other and from said first die and being movable with said first die a predetermined distance as said dies initially open, a stop stationary with respect to the movable die, and means responsive to further movements of said first die for engaging said stop and causing differential movements between each of said plates and said first die and between said plates thereby to dislodge the article from said die and to remove the article from said elements.

3. A mechanism of the class described comprising, in combination, cooperating dies for the production of molded articles, a first one of said dies being movable relative to a second die, relatively movable plates carried at one side of said first die, elements for engaging a molded article rigidly carried upon each of said plates and being slidably mounted within said first die, said plates being movable with said first die a predetermined distance as said dies initially open, a stop stationary with respect to the movable die, arresting means for preventing the movement of said plates with said first die upon engagement with said stop and a further predetermined movement of said first die thereby to dislodge the article from said first die, and means responsive to a final predetermined movement of said first die for releasing one plate only from said arresting means and for shifting said released plate relative to the other plate in synchronism with said first die thereby to separate the article from said elements.

4. A mechanism of the class described comprising, in combination, cooperating dies for the production of molded articles, a first one of said dies being movable relative to a second die, a stripper plate and a knockout plate both carried at one side of said first die, pins carried rigidly upon each of said plates and being slidably mounted within said first die, locking means for spacing said plates apart, said plates being initially spaced from said first die and being movable with said first die a predetermined distance as said dies initially open, a stop stationary with respect to the movable die, arresting means engageable with said stop for holding said plates stationary as said first die upon a further predetermined movement shifts towards engagement with said stripper plate thereby to dislodge the casting from said first die, and means responsive to a final predetermined movement of said first die for releasing said locking means so that said stripper plate may move in synchronism with said first die towards said knockout plate thereby to separate the casting from said pins.

5. A mechanism of the class described comprising, in combination, cooperating dies for the production of molded articles, a first one of said dies being movable relative to a second die, a stripper plate and a knockout plate both carried at one side of said first die, pins carried rigidly upon each of said plates and being slidably mounted within said first die, locking means carried by said knockout plate for spacing said plates apart from each other, said plates being initially spaced from said first die and being movable with said first die a predetermined distance as said dies initially open, a stop stationary with respect to the movable die, arresting means engageable with said stop for holding said plates stationary as said first die upon a further predetermined movement moves towards engagement with said stripper plate thereby to dislodge the casting from said first die, and means carried by said first die and rendered effective by a final predetermined movement of said first die for releasing said stripper plate from said locking means so that said stripper plate may move in synchronism with said first die towards said knockout plate thereby to separate the casting from said pins.

6. A mechanism of the class described comprising, in combination, cooperating dies for the production of molded articles, a first one of said dies being movable relative to a second die, a stripper head carried upon the parting face of said first die, a stripper pin slidably mounted within said first die and connected with said stripper head, a knockout pin slidably mounted within said first die, said stripper and said knockout pins being movable with said first die a predetermined distance as said dies initially open, a stop stationary with respect to the movable die, arresting means for preventing the movement of said pins with said first die upon engagement with said stop and a further predetermined movement of said first die thereby to cause relative movement between said stripper head and said first die, and means responsive to a final predetermined movement of said first die for releasing said stripper pin only from said arresting means and for shifting said stripper pin relative to said knockout pin in synchronism with said first die thereby to cause a differential movement between said knockout pin and said stripper head.

WILFRED G. HARVEY.

REFERENCES CITED

The following references are of record in the file of this patent:

UNITED STATES PATENTS

| Number | Name | Date |
| --- | --- | --- |
| 1,724,332 | Will et al. | Aug. 13, 1929 |
| 1,729,536 | Brumm | Sept. 24, 1929 |
| 2,047,379 | Matson | July 14, 1936 |
| 2,302,367 | Ericson | Nov. 17, 1942 |
| 2,304,899 | Dupre | Dec. 15, 1942 |
| 2,410,324 | Windsor et al. | Oct. 29, 1946 |